United States Patent [19]

Kobayashi et al.

[11] Patent Number: 4,491,922

[45] Date of Patent: Jan. 1, 1985

[54] METHOD AND APPARATUS FOR CONTROLLING STEPPING MOTOR IN IDLING ROTATIONAL SPEED CONTROL

[75] Inventors: Nobuyuki Kobayashi, Toyota; Hiroshi Ito, Nagoya, both of Japan

[73] Assignee: Toyota Jidosha Kogyo Kabushiki Kaisha, Toyota, Japan

[21] Appl. No.: 323,977

[22] Filed: Nov. 23, 1981

[30] Foreign Application Priority Data

Aug. 14, 1981 [JP] Japan .............................. 55-126690
Aug. 14, 1981 [JP] Japan .............................. 56-126691

[51] Int. Cl.$^3$ ...................... F02D 9/02; F02D 31/00; G06F 15/20

[52] U.S. Cl. ............................ 364/431.07; 123/339; 123/491; 123/585; 364/431.10

[58] Field of Search ............... 123/339, 491, 585, 589; 364/431.05, 431.07, 431.10

[56] References Cited

U.S. PATENT DOCUMENTS

| | | | |
|---|---|---|---|
| 4,237,833 | 12/1980 | Des Lauriers | 123/320 |
| 4,344,399 | 8/1982 | Matsumura et al. | 123/339 |
| 4,347,821 | 9/1982 | Saito | 123/440 |
| 4,348,729 | 9/1982 | Sasayama et al. | 364/431.12 |
| 4,364,348 | 12/1982 | Itoh et al. | 123/339 |
| 4,364,350 | 12/1982 | Kobayashi et al. | 123/339 |
| 4,365,601 | 12/1982 | Yamazoe et al. | 123/339 |
| 4,378,768 | 4/1983 | Itoh et al. | 123/339 |
| 4,414,943 | 11/1983 | Nagase | 123/339 |
| 4,417,553 | 11/1983 | Ohkawa et al. | 123/339 |

*Primary Examiner*—Felix D. Gruber
*Attorney, Agent, or Firm*—Finnegan, Henderson, Farabow, Garrett & Dunner

[57] ABSTRACT

A bypass path is provided parallel to an intake path portion provided with a throttle valve, and the sectional area of flow in the bypass path is controlled by a valve body displaced by a stepping motor. The step value of the stepping motor is stored in a first memory storage of an electronic control. A second memory storage can keep values irrespective of opening and closing an ignition switch and the step value is stored also in the second memory storage. Corrected step values are supplied to the first memory storage from the second memory storage, from read only memory, or from a value dependent on temperature in a manner which will not result in stalling of the engine due to momentary interruptions in the supply of electric power to the electronic control.

18 Claims, 7 Drawing Figures

METHOD AND APPARATUS FOR CONTROLLING STEPPING MOTOR IN IDLING ROTATIONAL SPEED CONTROL

BACKGROUND OF THE INVENTION

1. Field of the Invention

This invention relates to a method and apparatus for controlling a stepping motor in an idling rotational speed control of an electronically controlled motor vehicle engine which computes fuel injection amount, ignition timing, etc. with a microprocessor.

2. Description of the Prior Art

In an idling rotational speed control for a motor vehicle engine, a bypass path is provided parallel to an intake path portion provided with a throttle valve. The sectional area of flow in this bypass path is controlled by a valve body displaced by a stepping motor and, in the idling mode, controlled in relation to the idling rotational speed of an engine. The step value of the stepping motor (that is, the relative degree of opening of the bypass path) is stored in a first memory and a central processing unit operates the stepping motor on the basis of the step value in the first memory. An electronic control comprising the central processing unit and the first memory storage is supplied with a predetermined power in response to opening and closing of an ignition switch in a cab. When the ignition switch is opened, the central processing unit computes the operating amount of the stepping motor on the basis of the difference between a first predetermined value of the step value corresponding to the maximum value of the sectional area of flow in the bypass path and the step value in the first memory storage, and the stepping motor is operated by the amount corresponding to this operating amount according to electric signals from the electronic control so that the step value of the stepping motor becomes the first value. Also, start time control is carried out to make the sectional area of flow in the bypass path equal to a value related to engine temperature when the engine started, to provide a fast idle speed at low temperature. This start time control of the engine is carried out according to initializing signals produced as the line voltage supplied to the electronic control exceeds a predetermined value. This start time control operates the stepping motor on the basis of difference between the first predetermined value and a second predetermined value of the step value corresponding to the sectional area of flow in the bypass path and determined in relation to the engine temperature. However, if the supply of electric power to the electronic control is interrupted, stored values in the first memory storage are erased, and then, as the electric power is returned, the initializing signal is produced so that said start time control is carried out even though it is not actually start time. When start time control is initiated due to such electric power interruptions to the electronic control, problems are encountered causing the operating amount of the stepping motor to be increased, the bypass path to be completely closed and the rotation of the engine to be stopped (engine stop), since the stepping motor is operated on the basis of the difference between the first and second values even though the actual step value of the stepping motor is not the first value.

SUMMARY OF THE INVENTION

An object of the present invention is to provide a method of properly controlling a stepping motor in an idling rotational speed control to avoid problems causing stoppage of engine rotation even if the supply of electric power to electronic control is interrupted.

According to the method and apparatus for controlling the stepping motor in the idling rotational speed control of the present invention to achieve this object, a second memory storage supplied with electric power irrespective of opening and closing of an ignition switch is provided, and a step value of the stepping motor is stored in the second memory storage so that the step value in a first memory storage is made equal to the step value in the second memory storage if any electric power supply interruption condition occurs in the electronic control.

Thus, since the step value stored in the second memory storage can be stored in the first memory storage even if the memory of the step value in the first memory storage is erased by the momentary electric power supply interruptions to the electronic control, the step value of the stepping motor can be set to a proper value during starting time control even after momentary interruptions in the supply of electric power, so that the stoppage of engine rotation due to the complete closing of a bypass path can be avoided.

According to a preferred embodiment of this invention, when any electric power supply interruption conditions occur in the electronic control, it is determined whether or not the step value in the second memory storage is correct and, if correct, the step value in the first memory storage is made equal to the step value in the second memory storage, and if the second memory storage value is wrong, a first predetermined value equal to the step value corresponding to the maximum value of the sectional area of flow in the bypass path is stored in the first memory storage.

For example, a step value of the stepping motor is stored in the second memory storage as first and second binary numbers having the respective digital values in complementary relationship to each other, and if all binary digits in the first and second binary numbers are in the complemental relationship to each other, the step value in the second memory storage can be considered to be correct.

When the step value in the first memory storage is set to the first predetermined value and a starting motor is maintained inoperative though the initializing signal is produced due to the change in the electric power of the electronic control, the start time control of the stepping motor is preferably inhibited. Thus, if the step value in the second memory storage is wrong, the start time control is inhibited and the step value of the stepping motor is maintained at a value given right before the momentary interruption in electric power is supplied the electronic control, so that the sectional area of flow in the bypass path is not overly reduced and stoppage of the engine is avoided.

As mentioned before, after the ignition switch is opened (thus shutting down the engine) the stepping motor is operated on the basis of the difference between the step value in the first memory storage and the first predetermined value which corresponds to maximum air flow in the bypass path. Since the step value in the second memory storage is wrong, when the step value in the first memory storage is set to the first predetermined value, the difference between the step value in the first memory storage and the first predetermined value is smaller (i.e., zero) than the difference between the actual step value of the stepping motor and the first predetermined value, so that the stepping motor is not operated to the first predetermined value; that is, the bypass path is not opened to the maximum airflow position. Consequently, the next time the engine is started the stepping motor is not operated to a step value equal to the second value (dependent on temperature), but to a value smaller than the second value, i.e. a value corresponding to an extremely small sectional area of flow in the bypass path or zero so that the engine may not start.

According to another control method of the present invention, if the step value in the first memory storage is set to the first predetermined value because the step value in the second memory storage is wrong, the step value in the first memory storage is set to the second value (which will be more representative of the actual stepping motor condition) whenever the rotational speed of the engine is larger than a predetermined value.

Thus, if the step values of the stepping motor disappear from the first and second memory storages, the step value in the first memory storage is made a value close to the actual step value of the stepping motor immediately. As a result, troubles in the running of the engine due to the discrepancy between the step value in the first memory storage and the actual step value of the stepping motor are restrained. Sometimes, as when the vehicle is parked, the engine may be inoperative without being started even if the ignition switch is closed. In this case, the above-mentioned process (that is, setting the step value in the first memory storage to the second value) is not carried out. Instead, such process is only carried out when the rotational speed of the engine is larger than a predetermined value. Thus, when the engine is off, the ignition switch on, and the step value in the first memory storage is made the first value by the production of the initializing signal due to noise, the step value in the first memory storage is prevented from being made the second value.

In an embodiment of the present invention, when the step value in the first memory storage is made the first value because of the wrong value in the first memory storage and still the rotational speed of the engine is less than said predetermined value, the start time control, which makes the step value in the first memory storage equal to the second value, is not carried out.

DESCRIPTION OF THE PREFERRED EMBODIMENT

Figure 1:
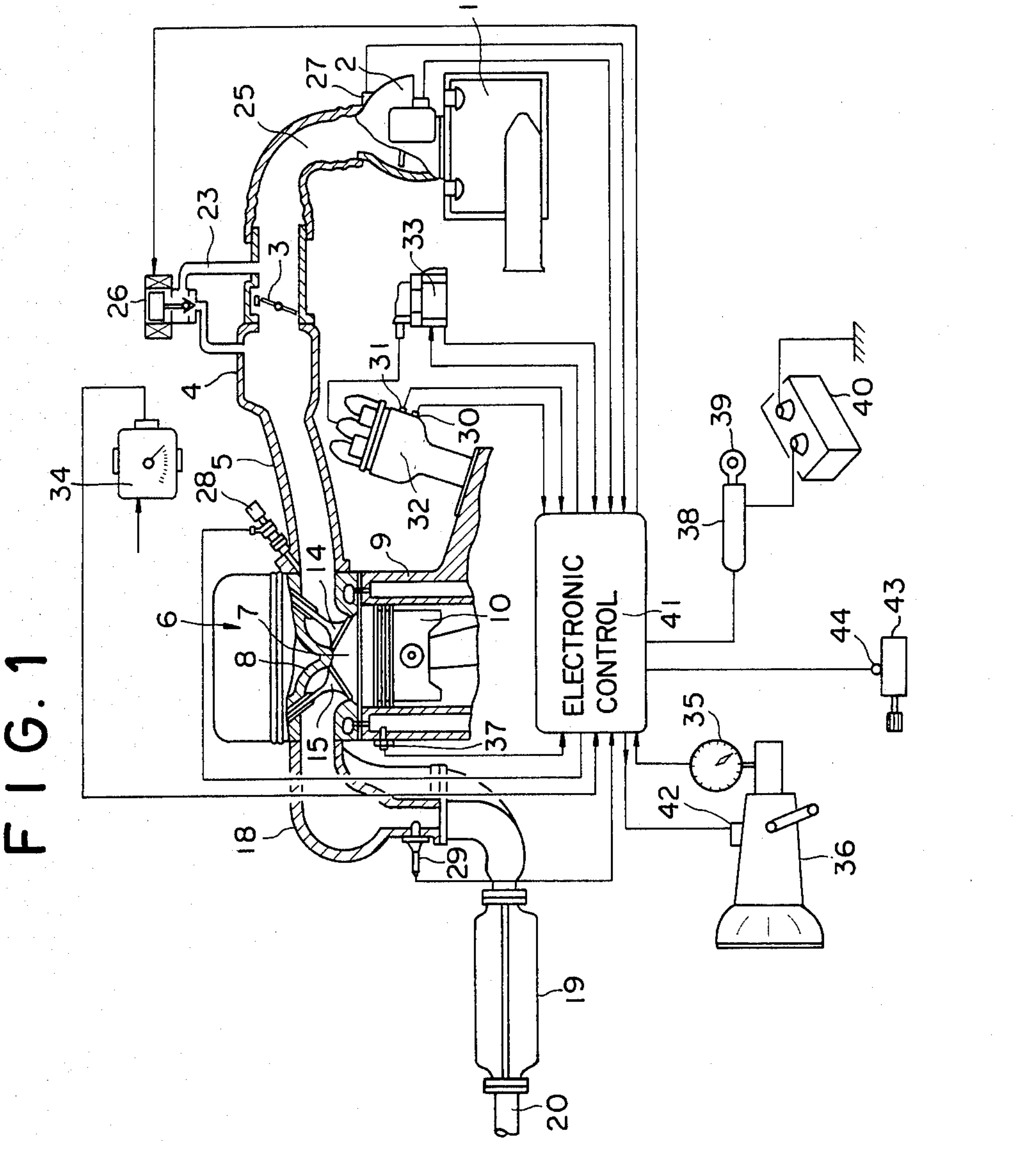
FIG. 1 is a schematic drawing showing the whole electronic control for an engine according to the present invention.

Referring now to FIG. 1, an intake system is provided, and consists of (sequentially from the upstream side) an air cleaner 1, an air flow meter 2 for detecting intake air flow, a throttle valve 3 interlocked with an accelerator pedal in a cab (not shown), a surging tank 4 and an intake pipe 5 which is connected to an engine body 6. A combustion chamber 7 in the engine body 6 is defined by a cylinder head 8, a cylinder block 9 and a piston 10. Mixture is supplied through an intake valve 14 to the combustion chamber 7 for combustion and discharged from the combustion chamber 7 through an exhaust valve 15.

An exhaust system is provided (sequentially from the upstream side) with an exhaust manifold 18, a catalyzer converter 19 receiving ternary catalyzer for promoting oxidation and reduction of noxious components in the exhaust gas and an exhaust pipe 20. A bypass path 23 interconnects a portion of an intake path 25 upstream of the throttle valve 3 and surging tank 4 and is provided with an electromagnetic controlling valve 26. The bypass path 23 is provided for stabilizing the rotation of an engine in the idling and low temperature time of the engine, and the electromagnetic controlling valve 26 controls the sectional area of flow in the bypass path 23 in relation to idling rotational speed and cooling water temperature engine temperature). The electromagnetic controlling valve 26 will be detailed later.

An intake temperature sensor 27 is provided near the air flow meter 2 to detect temperature of intake air. A fuel injection valve 28 is directed to the combustion chamber 7 and mounted on the intake pipe 5 to be opened and closed in response to electric input signals for injecting fuel. An $O_2$ (oxygen) sensor 29 mounted on the exhaust manifold 18 detects concentration of oxygen in the exhaust gas. A crank angle sensor consists of two portions 30, 31 to detect the crank angle from the rotation of a shaft of a distributor 32 connected to a crankshaft. One portion 30 produces one pulse every time the crank angle changes by 720°, and the other portion 31 produces one pulse every time the crank angle changes by 30°. An ignition coil 33 sends the secondary current to the distributor 32 which distributes this secondary current to an ignition plug in each combustion chamber. A throttle sensor 34 detects the opening of the throttle valve 3. A vehicle speed sensor 35 detects the rotation of an output shaft of an automatic transmission 36, i.e., vehicle speed. A water temperature sensor 37 mounted on the cylinder block 9 detects temperature of cooling water. An ignition switch 38 provided in the cab is operated by an engine key 39 and connected to a battery 40 for DC power supply. An electronic control 41 receives input signals from the air flow meter 2, intake temperature sensor 27, oxygen sensor 29, portions 30, 31 of crank angle sensor, ignition coil 33 (ignition confirming signal), throttle sensor 34, vehicle speed sensor 35, water temperature sensor 37, ignition switch 38 and a terminal 44 of a starting motor 43. The electronic control 41 sends output signals to the electromagnetic controlling valve 26, fuel injection valve 28, ignition coil 33 (primary current) and a solenoid 42 in an oil pressure controlling circuit of the automatic transmission 36. The electronic control 41 comprises a CPU (Central Processing Unit), ROM (Read Only Memory storage) and RAM (Random Access Memory storage) as microprocessors. The CPU determines fuel injection amount, fuel injection time and ignition timing according to a predetermined program of ROM.

Figure 2:
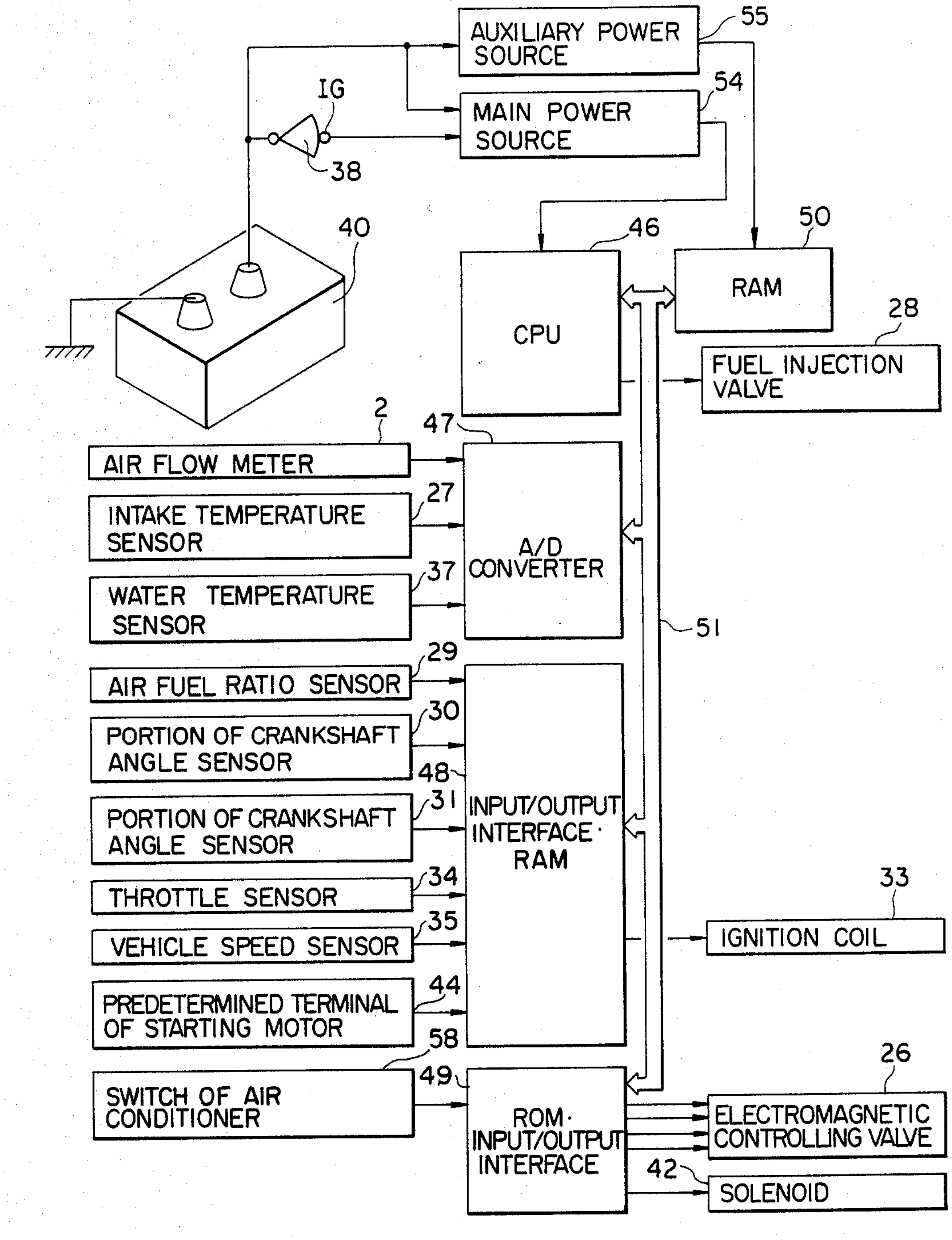
FIG. 2 is a block diagram showing the details of the electronic control shown in FIG. 1.

FIG. 2 is a detailed block diagram of the electronic control 41. A CPU 46, an A/D (Analog/Digital) converter 47, an input/output interface RAM 48, a ROM input/output interface 49 and a RAM 50 are connected to each other through a bus 51. The ignition switch 38 is connected to the battery 40 and an ignition terminal IG of the ignition switch connected to a main power source 54. The main power source 54 and auxiliary power source 55 are directly connected to the battery 40. Electric power of the main power source 54 is supplied to the CPU 46, A/D converter 47, input/output interface RAM 48 and ROM input/output interface 49. When the ignition switch 38 is closed, a relay of the main power supply 54 is operated to enable the main power source 54 to supply immediately electric power. Also, when the ignition switch 38 is opened, the supply of electric power from the main power source to CPU 46, etc., is maintained by delayed action of the relay of the main power source 54 for a predetermined time after the opening of the ignition switch 38. Since the auxiliary power source 55 supplies regulated electric power to RAM 50 irrespective of the opening and closing of the ignition switch 38, RAM 50 can store data also after stoppage of the engine. Analog signals from the air flow meter 2, intake temperature sensor 27 and water temperature sensor 37 are sent to the A/D converter 47. The outputs from the air fuel ratio sensor 29, portions 30, 31 of crankshaft angle sensor, throttle sensor 34, vehicle speed sensor 35 and terminal 44 of the starting motor 43 are sent to the input/output interface RAM 48. The outputs from switch 58 of an air conditioner, etc. are sent to ROM.input/output interface 49. Output signals from the CPU 46 are sent to the fuel injection valve 28 and the primary current is sent from the input/output interface.RAM to the ignition coil 33. Four outputs to the electromagnetic valve 26 and the output to the solenoid 42 are sent from the ROM.input/output interface 49.

Figure 3:
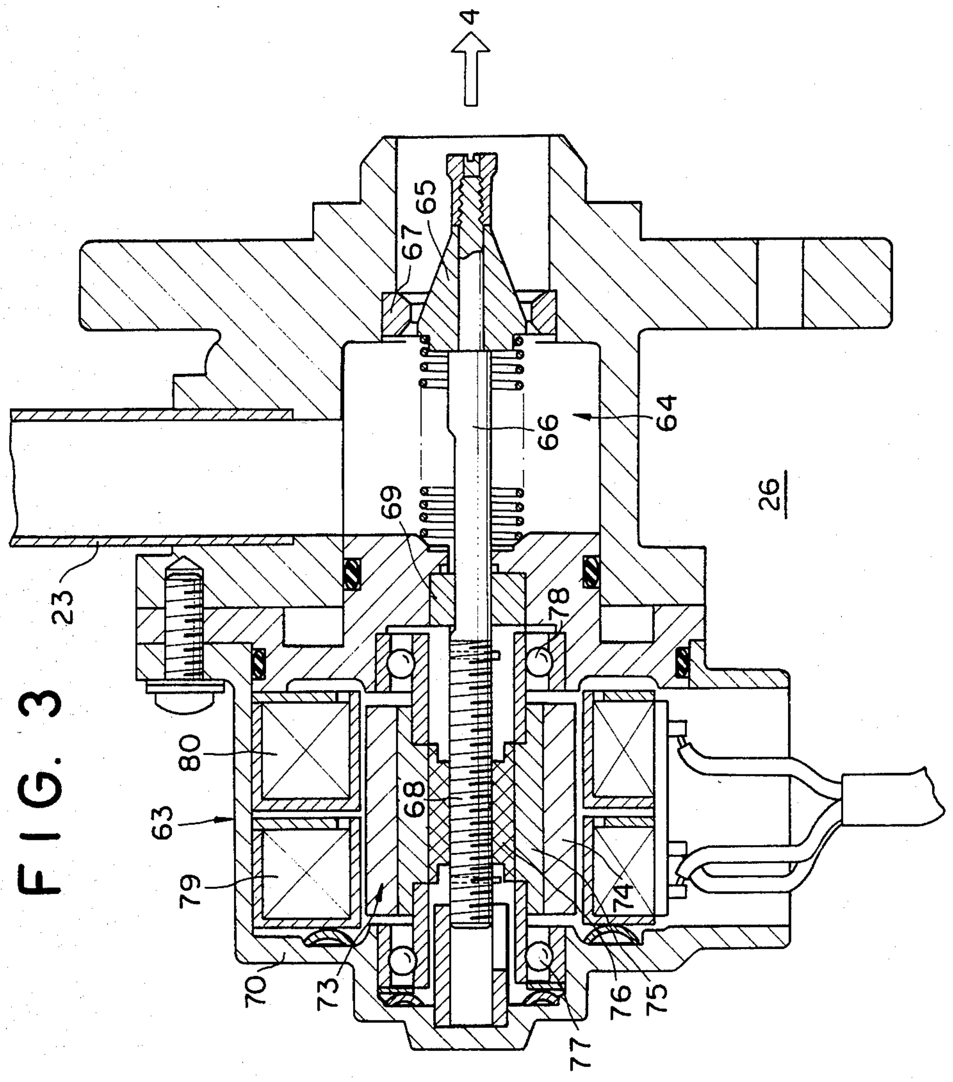
FIG. 3 is a block diagram of the electromagnetic controlling valve shown in FIG. 1.

FIG. 3 is a detailed view of the electromagnetic controlling valve 26. The electromagnetic controlling valve 26 consists of a stepping motor 63 and a valve portion 64 displaced by said stepping motor 63 which itself is well known. The valve body 65 is formed conically and fixed to an end of a valve rod 66. As the valve rod 66 moves axially, the dimension of clearance between the outer peripheral surface of the valve body 65 and the inner peripheral surface of a valve seat 67 varies so that the sectional area of flow in the bypass path 23 is controlled. The other end of the valve rod 66 is formed over a predetermined length with threaded portion 68 and supported in a housing 70 by a guide 69 axially movable, but not rotatably movable. A rotor 73 consists of a first cylindrical body 74 of permanent magnet, a second cylindrical body 75 of metal and a third cylindrical body 76 of resin in the order from the radial outer side to inner side and is rotatably supported in the housing 70 by bearings 77, 78. The first to third cylindrical bodies 74, 75, 76 are fixed to each other. The third cylindrical body 76 is formed on the inner periphery with internal threads to be screwed onto the threaded portion 68 of the valve rod 66, and on the outer peripheral surface of the first cylindrical body 74 are arranged alternatively N poles and S poles at equal angular intervals. The valve rod 66 is axially displaced by the rotation of the rotor 73. Outside the rotor 73 are arranged axially in series two stators 79, 80, which comprise respectively coils. In the respective coils are provided two input terminals, thus four input terminals in the whole stepping motor 63. The position of magnetic pole of the stator 79 is deviated circumferentially from that of the stator 80, and the magnetic pole is reversed by the alteration of the direction of current supplied to a solenoid so that the N pole and S pole of the stators 79, 80 are circumferentially and gradually displaced by sending pulses to four input terminals in a proper order to rotate the rotor 73 by a predetermined amount, i.e., increase or decrease the sectional area of flow in the bypass path 23 by a predetermined amount corresponds to the change of one step in the stepping motor 63. In the case of this electromagnetic controlling valve 26, the sectional area of flow in the bypass path 23 is zero when the step position of the stepping motor 63 is 0, and the sectional area of flow in the bypass path 23 is the maximum when the step position of the stepping motor 63 is 125.

Figure 4:
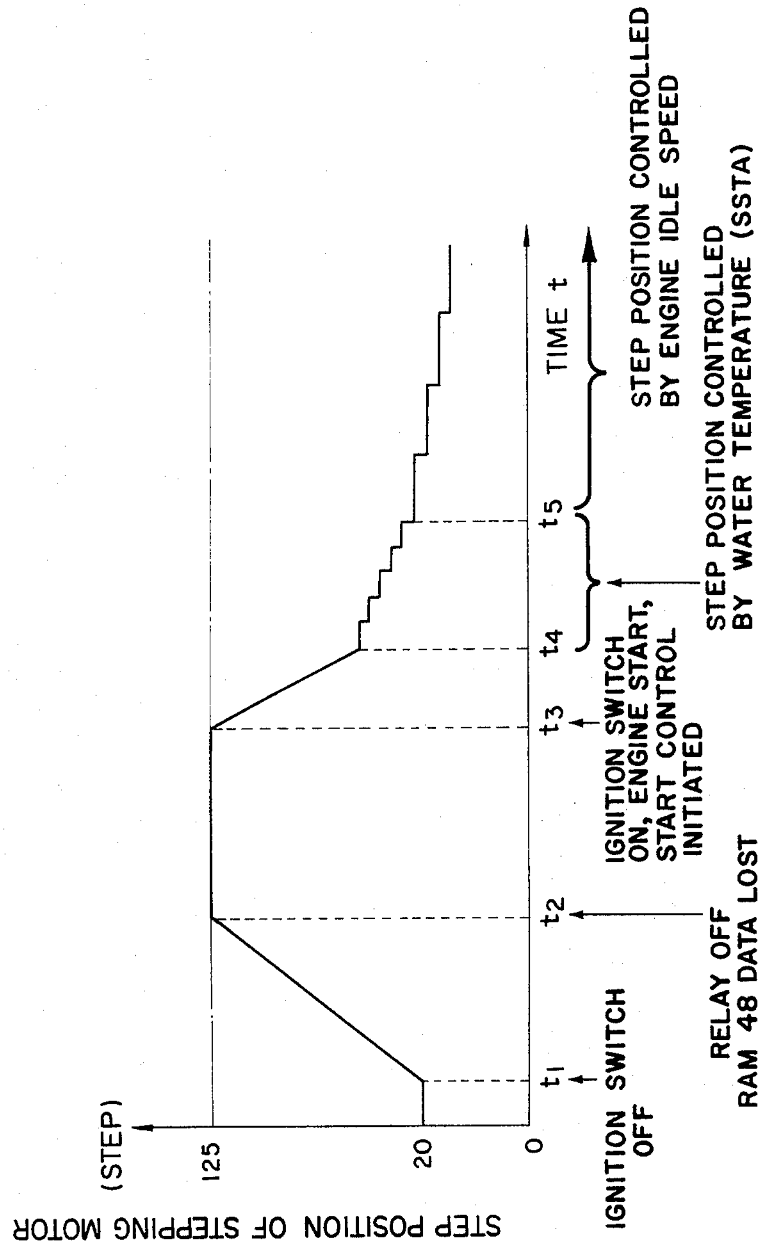
FIG. 4 is a drawing showing changes in the step position of a stepping motor.

FIG. 4 shows the change in the step position of the stepping motor 63. A value representative of the assumed step position of the stepping motor 63 is stored in a predetermined address (hereinafter called "CPMT" (Counter of Pulse Motor)) of input/output interface RAM 48 as a first memory storage. Also, the same value as that of CPMT is stored in a predetermined address (hereinafter called "CPMT2") of RAM 50 for a second memory storage. CPU 46 determines the operation value of the stepping motor 63 on the basis of the CPMT value.

The ignition switch 38 is opened in time t1, thus shutting down the engine. CPU 46 sends electric signals to the electromagnetic controlling valve 26 (stepping motor 63) through ROM.input/output interface 49 so as to increase the step position of the stepping motor 63 by an amount equal to 125 minus CPMT value plus 15. The value 125 is the maximum step position of the stepping motor 63 and the step position of the stepping motor 63 in which the sectional area of flow in the bypass path 23 becomes maximum, and 15 is a value to be added irrespective of CPMT value. Assuming CPMT value is 20 at time t1, the stepping motor 63 receives input signals so as to increase the step position by 120 steps. However, since the maximum step position of the stepping motor 63 is 125, the input corresponding to 15 steps becomes ineffective so that the step position of the stepping motor 63 is 125 at time t2 when input pulse from the electronic control 41 is completed. When the relay of the main power source 54 is operated at time t2 to stop the supply of electric power from the main power source 54, the contents of memory in the input/output interface Ram 48 are erased.

Figure 5:
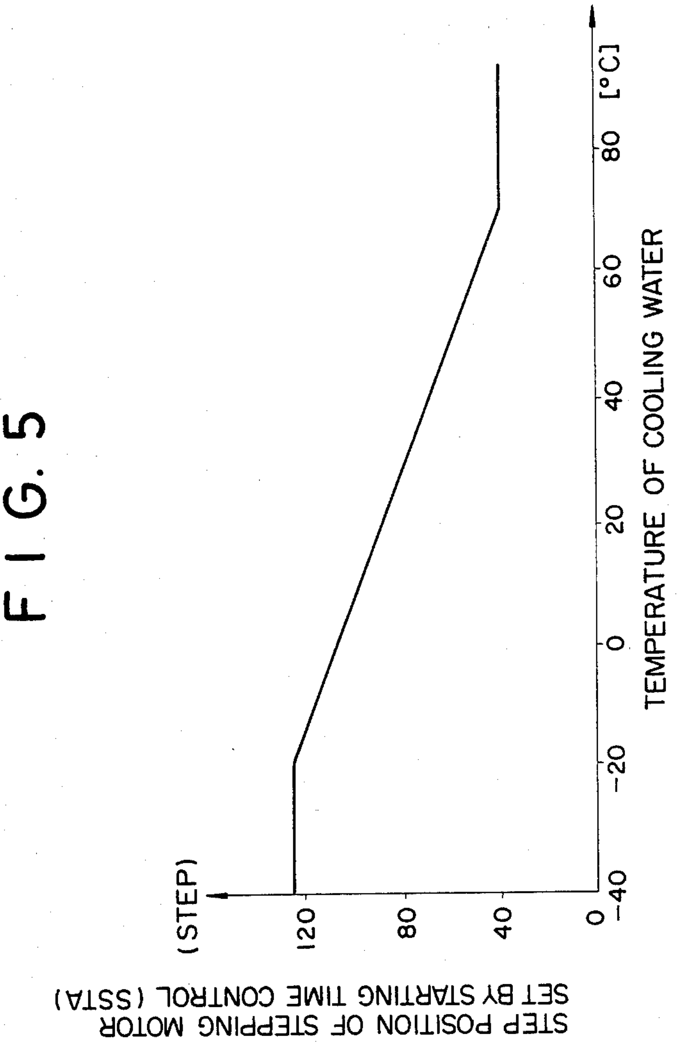
FIG. 5 is a graph showing the relationship between the step position of the stepping motor set by starting time control and the temperature of cooling water.

The ignition switch 38 is closed at time t3 in preparation for starting the engine, and when the main power source 54 begins to send electric power, the starting time control is carried out. In the starting time control, the step position of the stepping motor 63 is reduced from an initial value (ideally equal to 125) to a step position (SSTA) corresponding to the cooling water temperature, i.e., engine temperature. FIG. 5 shows the relationship between the cooling water temperature and SSTA. The lower the engine temperature at the starting time, the larger is SSTA. CPU sends pulses to the stepping motor 63 so as to reduce the step position of the stepping motor 63 by an amount equal to CPMT value minus SSTA. At the starting time, the CPMT value is 125. t4 represents time at which the starting time control is completed. From time t4 on, SSTA, and consequently the step position of the stepping motor 63, is reduced as the warming up proceeds, and the warming up is completed at time t5. From time t5 on, the step position of the stepping motor 63 is controllably fed back in relation to the idling rotational speed during engine idle.

Figure 6:
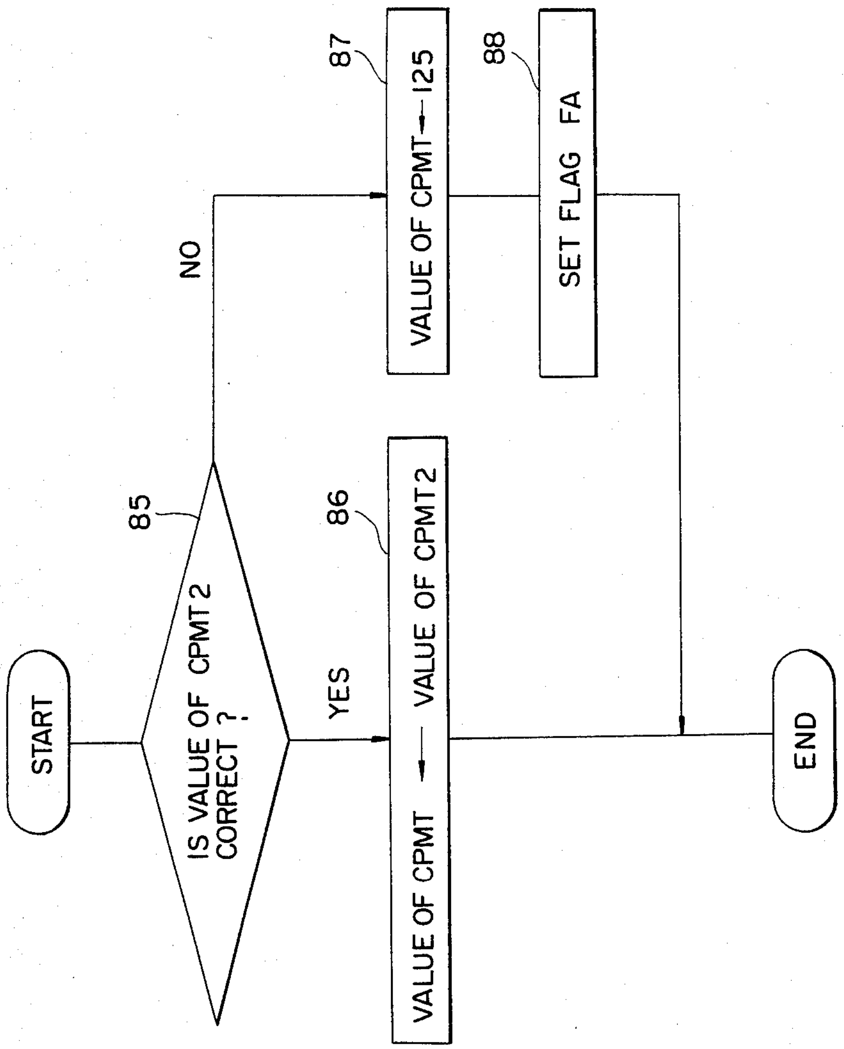
FIG. 6 is a flow chart showing an example of an initializing program storing the step position of the stepping motor in a first memory storage according to the present invention when initializing signals are produced.

FIG. 6 is a flow chart of an initializing program carried out when an initializing signal is produced. The initializing signal is produced when the output voltage of the main power source 54 changes from a value less than to that more than a predetermined value, i.e., the ignition switch 38 is closed and electric power is supplied from the main power source 54. In step 85 is judged whether or not the value of CPMT2 is correct and the program proceeds to step 86 if it is judged yes and to step 87 if no. Whether it is correct or not is judged by preparing two CPMT2s (one is called CPMT2a, the other CPMT2b) for example, and judging whether or not the values of CPMT2a and CPMT2b in all digits are in complementary relationship to each other. For example, if the value of CPMT2a is 11001010 in binary notation and the value of CPMT2b is 00110101 in binary notation, the values in the respective digits of both CPMT2s are in complementary relationship so that the values of CPMT2s can be judged to be correct. If the values of CPMT2a and CPMT2b in at least one digit are not in complementary relationship to each other, the value of CPMT2 is judged wrong. If a momentary interruption in the supply of electric power to the electronic control 41 should occur, the value of CPMT2 may become incorrect. In step 86, the value of CPMT of the input/output interface RAM 48 is set to CPMT2. In step 87, the value of CPMT is set to 125. In step 88, flag FA is made "1" (hereinafter one binary logic and the other are respectively defined as "1" and "0") i.e., set. Flag FA="1" means the inhibition of the starting time control.

Figure 7:
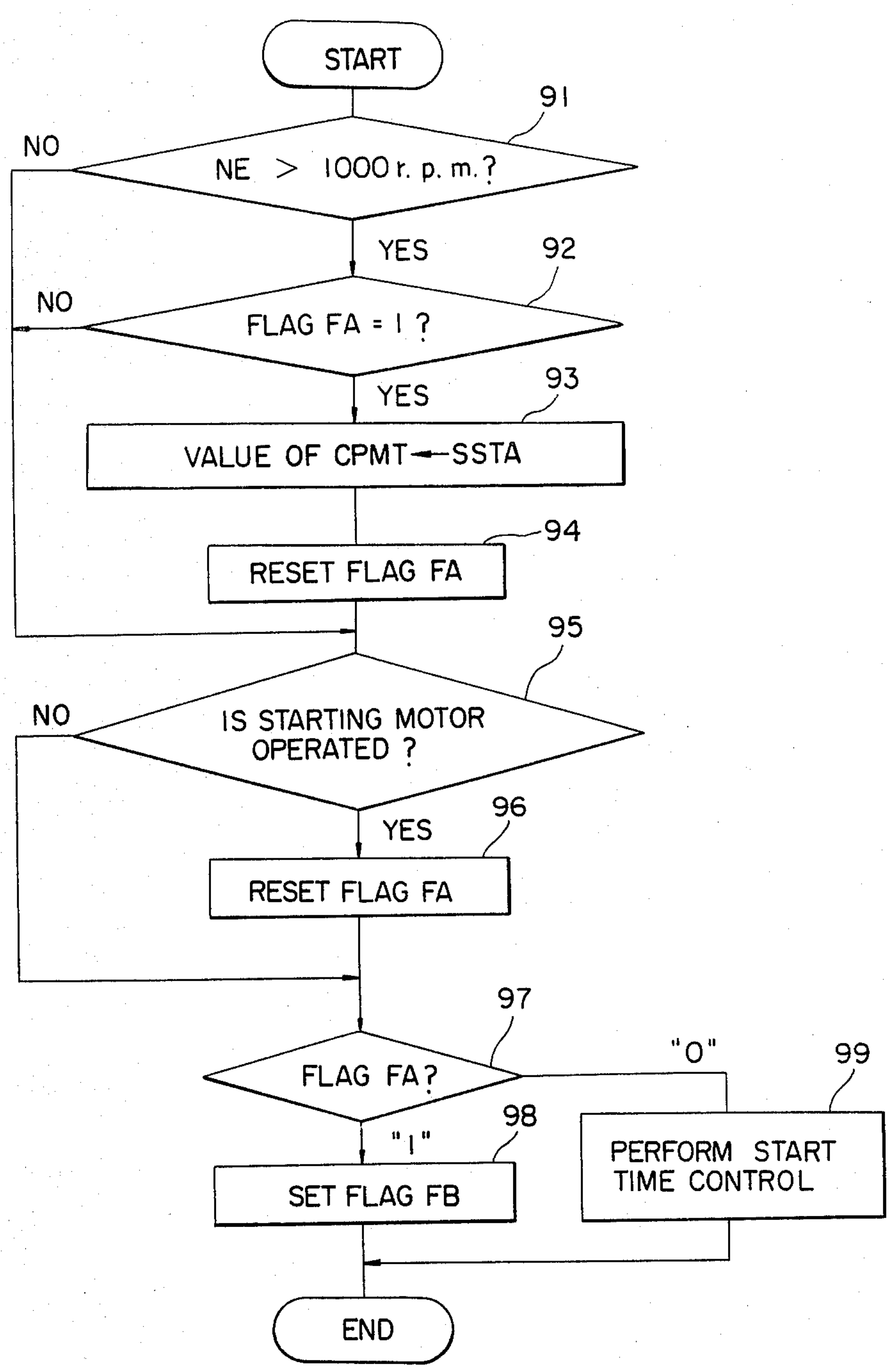
FIG. 7 is a flow chart showing an example of a program correcting the step value in the first memory storage according to the present invention and selecting whether or not start time control should be performed.

FIG. 7 is a flow chart of a program for correcting the CPMT value and selecting either performance or nonperformance of the starting time control. The program shown in FIG. 7 is included in the main program and performed following the program shown in FIG. 6. In step 91 it is judged whether or not the rotational speed NE of the engine is larger than 1000 r.p.m. and the program proceeds to step 92 if it is judged yes and to step 95 if no. The step 91 requiring that the rotational speed NE of the engine be larger than 1000 r.p.m. is included so that the steps 92–94 are performed only when the engine is running, but not in a period when the engine is stopped even though the ignition switch 38 is closed. Some drivers may close the ignition switch 38 and park the vehicle without starting the engine. In such a case, when the initializing signals are produced by noise to perform the step 87 shown in FIG. 6 and the step 93 were subsequently performed, the step value of the stepping motor 63 at the next actual starting time would become remarkably small or zero, thus preventing the running of the engine. The step 91 eliminates such an occurrence.

In the step 92 is judged whether or not flag FA is "1" and the program proceeds to step 93 if it is judged to be "1" and to step 95 if it is judged to be "0". The flag FA="1" means the step 87 shown in FIG. 6 has been performed. In step 93, the CPMT value is set to SSTA, that is, a step value dependent on cooling water temperature. Thus, though the CPMT value following this operation may not exactly coincide with the actual value of the stepping motor 63, it has a value extremely close to the actual value of the stepping motor 63. In step 94, flag FA is set to "0", i.e., reset. In step 95 is judged whether or not the starting motor 43 is being operated and the program proceeds to step 96 if it is judged yes and to step 97 if no. In step 96, flag FA is set to "0", i.e., reset. In step 97 is judged whether or not flag FA is "1" and the program proceeds to step 98 if it is judged yes and to step 99 if it is judged to be "0". In step 98, flag FB is made "1" i.e., set. Flag FB="1" means the completion of starting time control. In step 99 is performed the starting time control. In the starting time control, the step position of the stepping motor 63 is set to SSTA. As a result, if the CPMT value is correct (i.e., if the step 86 is performed or in the starting time) and if the CPMT value is approximately correct (i.e., if the step 93 has been already performed), the starting time control is carried out so that the step value of the stepping motor is SSTA. Also, if the CPMT value is completely different from the actual step value of the stepping motor 63 (i.e., if the step 93 is not yet performed though the step 87 has been performed), the performance of the starting time control is stopped. Accordingly, even if the initializing signal is produced by a momentary interruption of electric power which would otherwise cause the electronic control 41 to perform the starting time control and cause the step value of the stepping motor 63 to be reduced remarkably or to zero by the starting time control, the present invention avoids such obstacles to the running of the engine. In particular, even if the CPMT value is set to 125 because the value of CPMT2 is wrong, the CPMT value can be immediately set to a value close to the actual step value of the stepping motor 63 by the performance of the step 93 so that the obstacles against the running of the engine caused by the abnormal electric power in the electronic control 41 can be avoided.

What is claimed is:

1. Idling rotation speed control apparatus for an electronically controlled engine, comprising:
   - an engine air intake path portion;
   - a throttle valve in said intake path portion;
   - a bypass path parallel to said intake path portion;
   - a valve for controlling the sectional area of flow in said bypass path, said valve comprising a valve body and a stepping motor displacing said valve body according to step values;
   - an ignition switch;
   - an electronic control controllably supplied with electric power in response to the opening and closing of said ignition switch, said electronic control being connected to said sepping motor and comprising a central processing unit and first memory storage means for storing step values of said stepping motor;
   - second memory storage means for storing a step value of said stepping motor, said second memory storage means being supplied with electric power irrespective of the opening and closing of said ignition switch, and capable of continuous memory storage;
   - said central processing unit operating said stepping motor according to the step value stored in said first memory storage means to control the sectional area of flow in response to the idling rotation speed of the engine, storing the step value of said stepping motor in said second memory storage means, and making the step value stored in said first memory storage means equal to the step value stored in said second memory storage means following an interruption of electric power supplied to said electronic control; and said electronic control determining whether said second memory storage means step value is correct, and making said first memory storage means step value equal to said second memory storage means step value only when said second memory storage means step value is correct.

2. Apparatus as recited in claim 1, wherein said second memory storage means comprises means for storing first and second binary numbers the respective binary digits of which are complementary, and said central precessing unit determines that said second memory storage means step value is correct if all binary digits of said first and second binary numbers are in complementary relationship to each other.

3. Apparatus as recited in claim 1, wherein said electronic control makes said first memory storage means step value equal to a first predetermined value corresponding to the maximum value of sectional area of flow in said bypass path whenever said second memory storage means step value is determined to be wrong.

4. Apparatus as recited in claim 3, wherein said electronic control performs a start time control operation on the sectional area of flow in said bypass path upon receipt of a variation in power through said ignition switch by storing a step value in said first memory storage means according to temperature of the engine.

5. Apparatus as recited in claim 4 wherein said start time control operation is inhibited when a starting motor of the engine is inoperative and said first memory storage means step value is equal to said first predetermined value.

6. Apparatus as recited in claim 1, wherein said electronic control operates said stepping motor according to the difference between a step value stored in said first memory storage means and a first predetermined value corresponding to the maximum value of sectional area of flow to make said sectional area of flow equal to said maximum value; and wherein said electronic control operates said stepping motor during starting time of the engine according to the difference between said first predetermined value and a second predetermined value corresponding to engine temperature.

7. Apparatus as recited in claim 6 wherein said electronic control determines whether said second memory storage means step value is correct following an interruption in power supplied to said electronic control;

wherein said electronic control makes said first memory storage means step value equal to said second memory storage means step value when said second memory storage means step value is correct;

wherein said electronic control makes said first memory storage means step value equal to said first predetermined value when said second memory storage means step value is incorrect; and wherein said electronic control, following such power interruption, makes said first memory storage means step value equal to said second predetermined value whenever said first memory storage means step value is equal to said first predetermined value and the rotational speed of the engine exceeds a predetermined rotational value.

8. Apparatus as recited in claim 7 wherein said second memory storage means comprises means for storing first and second binary numbers, and wherein said electronic control stores a step value in said second memory storage means such that the binary digits of first and second binary numbers are in complementary relationship and determines that said second memory storage means step value is correct when said first and second binary numbers are in complementary relationship upon read-out.

9. Apparatus as recited in claim 7, wherein said electronic control means inhibits said start time control operation when said first memory storage means step value is equal to said first predetermined value, said second memory storage means step value is wrong, and the rotation speed of the engine is below said predetermined rotation value.

10. A method for idling rotation speed control for an electronically controlled engine having an intake path portion, a throttle valve in the intake path portion, a bypass path parallel to the intake path portion, and a valve operated by a stepping motor for controlling the sectional area of flow in the bypass path, said method comprising the steps of:

operating the stepping motor according to a step value stored in a first memory storage means controllably supplied with electric power in response to the opening and closing of an ignition switch to control the sectional area of flow in response to the idling rotation speed of the engine;

storing the step value of the stepping motor in the first memory storage means;

storing the step value of the stepping motor in a second memory storage means supplied with electric power irrespective of the opening and closing of said ignition switch and capable of continuous memory storage;

determining whether the step value stored in the second memory storage means is correct; and making the step value stored in the first memory storage means equal to the step value stored in the second memory storage means following an interruption in electric power supplied to said electronic control only when the second memory storage means step value is correct.

11. A method as recited in claim 10, comprising the additional steps of storing first and second binary numbers, the respective binary digits of which are complementary, in the second memory storage means and determining that the second memory storage means step value is correct if all binary digits of the first and second binary numbers are in complementary relationship to each other upon readout.

12. A method as recited in claim 10, comprising the additional steps of making the first memory storage means step value equal to a first predetermined value corresponding to the maximum value of sectional area of flow in the bypass path whenever the second memory storage means step value is determined to be wrong.

13. A method as recited in claim 12, comprising the additional steps of performing a start time control operation on the sectional area of flow in the bypass path upon receipt of a variation in power through the ignition switch by storing a step value in the first memory storage means according to temperature of the engine.

14. A method as recited in claim 13 comprising the additional step of inhibiting the start time control operation when a starting motor of the engine is inoperative and the first memory storage means step value is equal to the first predetermined value.

15. A method as recited in claim 10, comprising the additional steps of operating the stepping motor according to the difference between a step value stored in the first memory storage means and a first predetermined value corresponding to the maximum value of sectional area of flow to make the sectional area of flow equal to the maximum value; and operating the stepping motor during starting time of the engine according to the difference between the first predetermined value and a second predetermined value corresponding to engine temperature.

16. A method as recited in claim 15 comprising the additional steps of:

determining whether said second memory storage means step value is correct whenever abnormal power is produced in said electronic control;

making the first memory storage means step value equal to the second memory storage means step value when the second memory storage means step value is correct;

making the first memory storage means step value equal to the first predetermined value when the second memory storage means step value is incorrect; and making the first memory storage means step value equal to the second predetermined value whenever the first memory storage means step value is equal to the first predetermined value and the rotational speed of the engine exceeds a predetermined rotational value.

17. A method as recited in claim 16 comprising the additional steps of storing as step value in the second memory storage means such that the binary digits of first and second binary numbers are in complementary relationship and determining that the second memory storage means step value is correct when the first and second binary numbers are in complementary relationship upon read-out.

18. A method as recited in claim 16, comprising the additional steps of inhibiting the start time control operation when the first memory storage means step value is equal to said first predetermined value, the second memory storage means step value is wrong, and the rotation speed of the engine is below the predetermined rotation value.

* * * * *

UNITED STATES PATENT AND TRADEMARK OFFICE
CERTIFICATE OF CORRECTION

PATENT NO. : 4,491,922

DATED : January 1, 1985

INVENTOR(S) : Nobuyuki KOBAYASHI & Hiroshi ITO

It is certified that error appears in the above-identified patent and that said Letters Patent is hereby corrected as shown below:

We have found the following error in "Foreign Application Priority Data":

August 14, 1981 Japan ..... 55-126690

The correct date is

August 14, 1981 Japan ..... 56-126690

Signed and Sealed this

*Fifteenth* Day of *October 1985*

[SEAL]

*Attest:*

DONALD J. QUIGG

*Attesting Officer*

*Commissioner of Patents and Trademarks—Designate*